June 14, 1949.  L. S. WILLIAMS  2,473,084
WEIGHING SCALE POISE
Filed Jan. 29, 1946  2 Sheets-Sheet 1
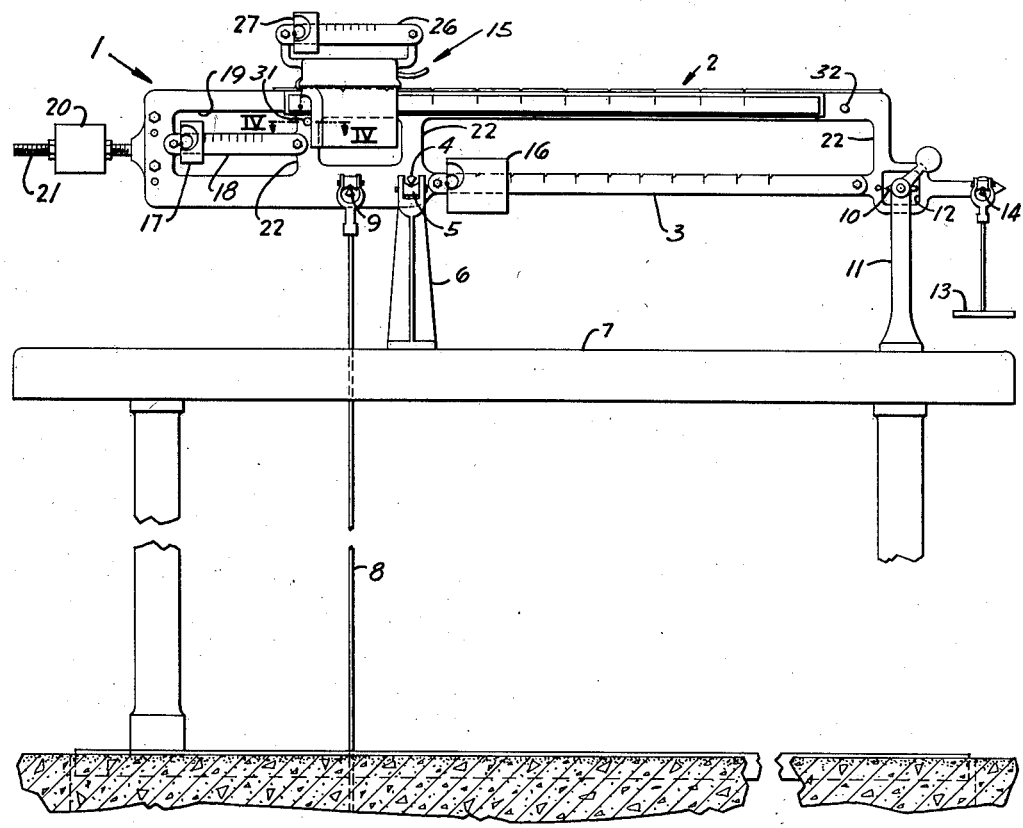
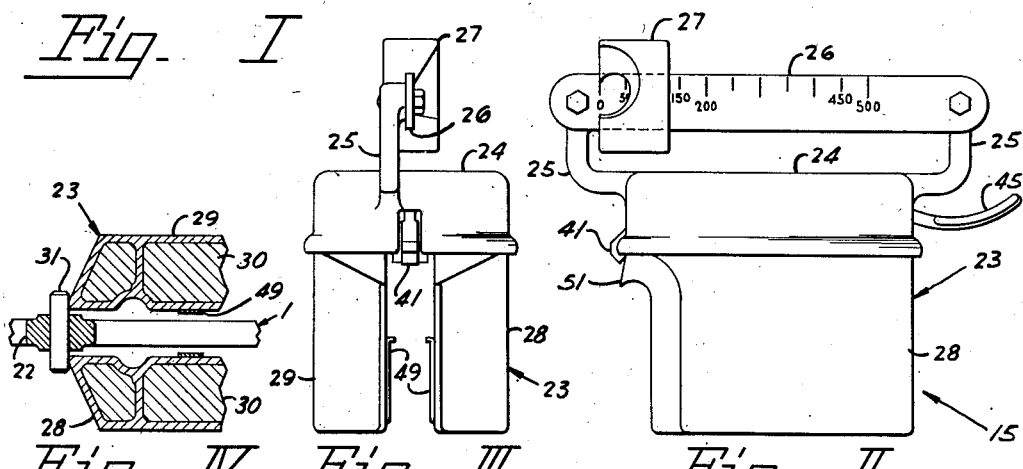
INVENTOR.
Lawrence S. Williams
BY
Marshall & Marshall
ATTORNEYS June 14, 1949.                 L. S. WILLIAMS                 2,473,084
                            WEIGHING SCALE POISE
Filed Jan. 29, 1946                                         2 Sheets-Sheet 2
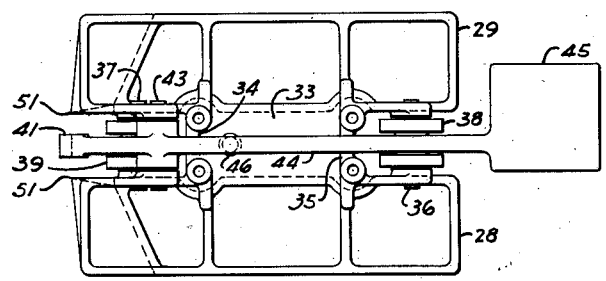
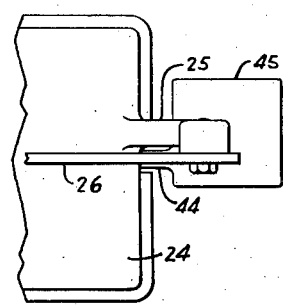
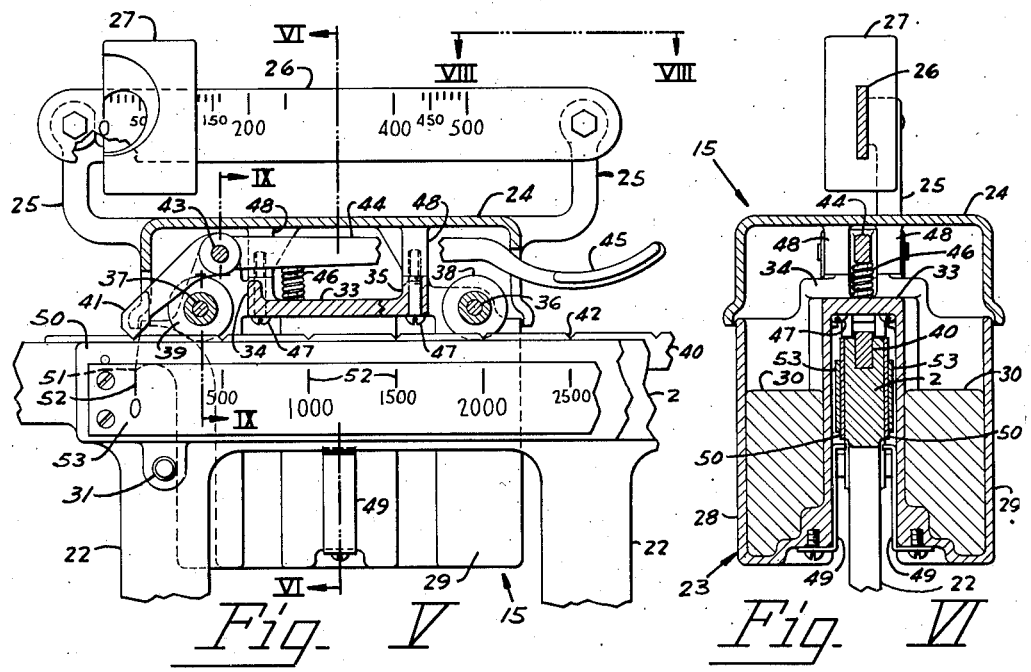
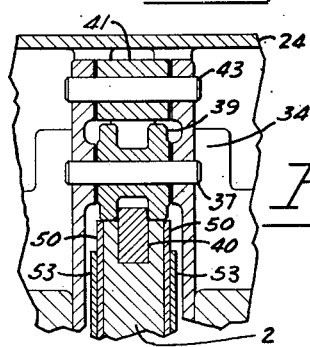
INVENTOR.
Lawrence S. Williams
BY
Marshall & Marshall
ATTORNEYS Patented June 14, 1949

2,473,084

UNITED STATES PATENT OFFICE 2,473,084

WEIGHING SCALE POISE

Lawrence S. Williams, Toledo, Ohio, assignor to Toledo Scale Company, Toledo, Ohio, a corporation of New Jersey Application January 29, 1946, Serial No. 644,031

3 Claims. (Cl. 265—56.5)

This invention relates to weighing scales and in particular to an improved poise construction for use with a weigh beam.

In the interest of economy of manufacture it is desirable that the various elements making up a mechanism should be so designed that selective assembly or precision adjustment is not essential to satisfactory performance of the mechanism. Weighing scale poises have long been constructed of two parts machined to match each other and designed to completely encircle that section of the weigh beam along which they slide. The division lines between the parts of these poises is along a vertical plane extending through the beam or immediately adjacent thereto. In this common construction it is necessary to accurately fit the two halves of the poise together in order to obtain a smooth exterior and it is also necessary to machine the openings through the poise to accurately match the cross section of the beam. Another disadvantage of the split construction appears when rollers are used to support the poise on a beam because very accurate machining is required to insure accurate alignment of the roller axles so that the poise will run easily along the beam.

The principal object of this invention is to provide a poise construction requiring a minimum of precision machining.

Another object of the invention is to provide a poise construction employing rollers in which all of the rollers are journaled in one member and, therefore held in precise alignment.

Another object of the invention is to provide a poise which is suitable for use on weigh beams of various depths.

A still further object is to provide a poise which may be operated past vertical ties between various parts of a composite weigh beam without interfering with the ties.

Another object is to provide a poise construction in which the handle of the locating device is equally accessible from either side of the beam and which does not interfere with the use of a fractional poise and beam mounted on the main poise.

These and other objects and advantages are apparent from the following description of a specific form of the invention which is shown in the accompanying drawings.

In the drawings:

Figure I is a front elevation of a weigh beam equipped with a poise constructed according to the principle of the invention.

Figure II is a front elevation of the poise.

Figure III is an end elevation of the poise.

Figure IV is a fragmentary cross section of the poise and a fragment of the weigh beam taken substantially along the line IV—IV of Figure I.

Figure V is a vertical section of the poise, the plane of the section being taken slightly forward from the front surface of the weigh beam.

Figure VI is a vertical transverse section of the poise and weigh beam taken along the line VI—VI of Figure V.

Figure VII is a plan view of the poise with its cover removed.

Figure VIII is a fragmentary plan view of one end of the cover as seen from the line VIII—VIII of Figure V.

Figure IX is a fragmentary vertical section taken substantially along the line IX—IX of Figure V.

These specific figures and the accompanying description are intended merely to illustrate the invention but not to impose limitations upon the claims.

According to the invention the improvements in poise construction permitting economies in manufacture and ease of adjustment in use are attained by making the poise in the form of an inverted U-shaped casting adapted to straddle the beam, providing vertical pockets open at the top in each leg of the inverted U, and providing rollers and a lock mounted in that portion of the casting overlying the beam. A suitable skirted cover having integral brackets for carrying a fractional beam and poise is adapted to fit over the top of the casting and thus cover the rollers, the latch, and the open ends of the pockets. The only precision machine work required on the improved poise is boring the holes for the axles of the rollers and the latch. Because this machining is all done in one member it is impossible for the roller axles to become misaligned because of faulty assembly. The straddling feature of the improved poise offers the added advantage that the poise will fit weigh beams of various depths, the only alteration required by changing weigh beam depth being the replacement of a small clip which prevents the poise from being lifted from the beam. Because the clip serves no other function than to retain the poise it may be narrow enough to clear any vertical ties or braces that may be used in connection with the weigh beam.

A poise constructed to embody the improvements of the invention is illustrated in the accompanying drawings. Referring to Figure I, a weigh beam 1 having an upper beam 2 and a lower beam 3 is provided with a fulcrum knife edge 4 which rests on V-bearings 5 mounted in the top of a pedestal 6 erected from a weigh beam shelf 7. Load forces to be weighed are transmitted through a steelyard rod 8 suspended from a load pivot 9 of the weigh beam 1. The oscillatory travel of the weigh beam 1 is limited by a lock 10 mounted in the top of a stand 11 erected from the weigh beam shelf 7, the lock 10 engaging a trig loop 12 formed in the end of the weigh beam 1. A counterweight platter 13 suspended from a tip pivot 14 of the weigh beam 1 is adapted to receive counterweights used for increasing the counterbalancing effort of the weigh beam.

The weigh beam 1 is provided with a load poise 15 and tare poises 16 and 17. The tare poise 16 is mounted on the lower beam 3 while the tare poise 17 of small weighing capacity is mounted on a fractional beam 18 spanning a window 19 cut in one end of the weigh beam 1. In addition to the poises an adjustable counterweight 20 carried on a threaded shaft 21 extending laterally from the weigh beam 1 is provided to balance the weigh beam to zero when the initial load—the weight of the platform and other permanent structure—is applied to the weigh beam 1.

In this example the weigh beam 1 is of unique construction in that its center of gravity is disposed at a considerable distance above its pivot line in order to compensate for a spring effect present in the force transmitting system between the load receiver of the scale and the steelyard rod 8. In a scale employing levers the weigh beam 1 would be constructed with its center of gravity lying substantially in the plane through its pivots.

The upper beam 2 and the lower beam 3 of the weigh beam 1 are held in vertical spaced relationship by a plurality of vertical ties 22 all of which are formed integrally with the weigh beam. The main poise 15 is formed to straddle the upper weigh beam 2 and having no interconnecting portions below the level of the weigh beam is able to operate past the vertical ties 22.

The poise 15 also generally illustrated in Figures II and III comprises a main casting 23 formed in the shape of an inverted U of which the connecting part of the U is contained within a skirted cover 24. The cover 24 is provided with a pair of arms 25 which extending outwardly and upwardly support a fractional beam 26 on which is mounted a fractional poise 27. The main casting 23 is formed with a pair of depending side members 28 and 29 which being hollow provide vertical pockets in which masses 30 of lead or other suitable material may be secured to adjust the weight of the poise.

The travel of the poise 15 along the upper weigh beam 2 is limited by a pair of pins 31 and 32 set into the upper beam 2 in such positions that the pin 31 is contacted by the poise 15 when the poise is in the zero position and the pin 32 is contacted when the poise is moved slightly beyond its maximum load position.

The detail assembly of the various parts of the poise is illustrated in Figures V—IX. Referring to Figures V, VI and VII the depending portions 28 and 29 of the main casting 23 of the poise 15 are joined at their upper inner edges by a flat section 33 provided with upturned stiffening ribs 34 and 35 located at the ends of the poise and transverse to its long dimension. The inner walls of the side members 28 and 29 extend longitudinally of the poise beyond the ends of the flat portion 33 and at generally greater height than the raised ribs 34 and 35. These portions are bored transversely to form bearings which journal axle shafts 36 and 37 of poise supporting rollers 38 and 39. The rollers 38 and 39 are spool shaped so that their larger diameter end portions may straddle a notched bar 40 inserted in the top surface of the upper weigh beam 2 and roll on the upper surface of the weigh beam 2. Because both ends of each of the axle shafts 36 and 37 are journaled in holes bored in the same casting there is no possibility whatsoever for the axles to become misaligned due to faulty assembly. Therefore the friction and binding which is occasionally experienced in the ordinary construction of roller supported poises is completely eliminated in the improved poise.

The poise 15 is positioned along the upper beam 2 by a latch 41 whose tip engages notches 42 in the notched bar 40. The latch 41 is journaled on a pin 43 extending transversely through upwardly extending portions of the inner walls of the poise sections 28 and 29 in the space generally above the supporting roller 39. It is provided with an arm 44 extending along the long dimension of the poise and terminating in a flat handle portion 45. The skirted cover 24, being notched at one end to accommodate the latch 41 and at the other end to accommodate the arm 44, may be installed or removed without disturbing the assembly of the latch or rollers in the main body of the poise. A small coil spring 46 held compressed between the lower surface of the arm 44 and the upper surface of the connecting portion 33 joining the poise sections 28 and 29 urges the latch 41 firmly into engagement with the notches 42 of the notched bar 40.

The skirted cover 24 is held in place on the main poise body 23 by a plurality of screws 47 extending upwardly through holes drilled in the corners of the connecting portion 33 between the poise sections 28 and 29 and threaded into downwardly extending posts 48 formed in the interior of the cover 24.

After the poise has been placed in position on the weigh beam 2 a pair of elongated Z-shaped clips 49 are attached to the bottoms of the poise portions with the clips extending upwardly in the space between the sections such that their upper ends are located immediately below side plates 50 attached to the sides of the weight beam 2. The clips 49 whose lengths may be varied to suit the dimensions of the weigh beam on which the poise is used serve to prevent the poise from being removed from the beam or the rollers from being derailed from the upper surface of the beam.

One end of the poise body 23 is shaped to form an index point 51 adapted to cooperate with indicia 52 engraved or otherwise marked in a chart strip 53 attached to the face of the weigh beam 2. Instead of the conventional C-shaped indicia revealing opening in the end of the poise the indicating portion of the improved poise is shaped substantially like an inverted J in which the index point 51 corresponds to the end of the curved bottom part of the J.

By thus relieving the space below the indicium being indicated greater readability is secured. The long vertical front edge of the poise section serves to guide the observer's eye directly to the indicium to be read.

The improved shape of the poise with its upwardly opening weight receiving pockets, its removable cover and its method of support, permits the main portion of the poise to be set on the beam with the clips 49 and the cover 24 loosely laid on the poise and the scale sealed or adjusted by the addition or removal of loose material from the pockets. After the scale has been adjusted the cover 24 and the clips 49 are lifted off and the loose material is anchored in the pockets. The cover may then be attached, the poise placed in position on the beam and the clips 49 installed with assurance that the scale will not be thrown out of adjustment.

The construction of the improved poise is such that there are no exposed crevices or holes in which dirt may lodge nor is there any possibility that the alignment of the axles of the rollers can be disturbed so that the free movement of the poise is detrimentally affected.

Having described the invention, I claim:

1. A poise for a weigh beam, the poise comprising a bifurcated casting adapted to straddle the weigh beam, each leg of the bifurcated casting being hollow and open at the top, and covering means for closing the openings.

2. A poise for a weigh beam, the poise being formed of two parts separable along a generally horizontal plane, the upper part forming a cover, the lower part having two depending hollow portions adapted to hang on either side of the weigh beam, and a bridge portion connecting the depending portions, the bridge portion having means for journaling rollers adapted to support the poise from the beam and a latch for positioning the poise along the beam.

3. In a poise for a weigh beam, a bifurcated casting each side of which is hollow, a pair of rollers journaled in the connecting portion between the sides of the casting and a latch mounted in the connecting portion above the rollers and adapted to engage the weigh beam when the poise is in place on the weigh beam, and a cover for the poise, the cover having upstanding arms to which a fractional beam may be attached.

LAWRENCE S. WILLIAMS.

REFERENCES CITED

The following references are of record in the file of this patent:

UNITED STATES PATENTS

| Number | Name | Date |
| --- | --- | --- |
| 575,143 | Brough | Jan. 12, 1897 |
| 759,016 | Romig | May 3, 1904 |
| 920,942 | Fleming | May 11, 1909 |
| 1,195,719 | Pfeiffer | Aug. 22, 1916 |
| 1,511,177 | Sykes | Oct. 7, 1924 |
| 1,940,576 | Bousfield | Dec. 19, 1933 |
| 2,368,984 | Hart | Feb. 6, 1945 |